United States Patent
Lioe (10) Patent No.: US 8,798,180 B1
(45) Date of Patent: Aug. 5, 2014

(54) METHOD AND APPARATUS FOR TRANSMITTING TIME DOMAIN SIGNALS OVER A NETWORK

(71) Applicant: Hidayat Lioe, Union City, CA (US)

(72) Inventor: Hidayat Lioe, Union City, CA (US)

(73) Assignee: Marvell International Ltd., Hamilton (BM)

( * ) Notice: Subject to any disclaimer, the term of this patent is extended or adjusted under 35 U.S.C. 154(b) by 93 days.

(21) Appl. No.: 13/664,718

(22) Filed: Oct. 31, 2012

Related U.S. Application Data (60) Provisional application No. 61/560,724, filed on Nov. 16, 2011, provisional application No. 61/694,639, filed on Aug. 29, 2012.

(51) Int. Cl.
H04L 27/28 (2006.01)

(52) U.S. Cl.
USPC .......................................... 375/260; 370/210

(58) Field of Classification Search
USPC .......................................... 375/260; 370/210
See application file for complete search history.

(56) References Cited

U.S. PATENT DOCUMENTS

| 2011/0055306 | A1* | 3/2011 | Dean et al. ................... 708/401 |
| 2011/0292816 | A1* | 12/2011 | Lee et al. ..................... 370/252 |
| 2013/0266145 | A1* | 10/2013 | Purnhagen et al. ............ 381/22 |

* cited by examiner

Primary Examiner — Don N Vo (57) ABSTRACT

Systems and methods are provided for transmitting time domain signals over a network. A prime factor inverse Fourier transform module is configured to receive a frequency domain symbol comprising n samples and convert the frequency domain symbol into a time domain signal. The prime factor inverse Fourier transform module includes a prime factor module that is configured to perform an inverse Fourier transform on the frequency domain symbol to reduce the number of samples of the frequency domain symbol by a factor of p, where p is a prime number, and where p is a factor of n. The prime factor inverse Fourier transform module further includes a reduced inverse Fourier transform module that is configured to convert the reduced number of samples to a time domain signal for transmission over the network.

20 Claims, 7 Drawing Sheets

METHOD AND APPARATUS FOR TRANSMITTING TIME DOMAIN SIGNALS OVER A NETWORK

CROSS-REFERENCE TO RELATED APPLICATIONS

This disclosure claims priority to U.S. Provisional Patent Application No. 61/560,724, filed Nov. 16, 2011, entitled "Structure of a Prime Factored FFT with Hermitian Symmetry," and U.S. Provisional Patent Application No. 61/694,639, filed Aug. 29, 2012, entitled "Structure of a Prime Factored FFT with Hermitian Symmetry," both of which are incorporated herein by reference.

FIELD

The technology described herein relates generally to network data transmission and more particularly to time domain data encoding.

BACKGROUND

Certain data transmission methods and protocols utilize forms of frequency division multiplexing for transmission of data. For example, orthogonal frequency division multiplexing (OFDM) is a frequency division multiplexing scheme used as a digital multi-carrier modulation method. In OFDM a number of closely spaced orthogonal sub-carrier signals are used to carry data. OFDM symbols are often specified in the frequency domain. Prior to transmission of an OFDM signal, a transmitter may perform certain transformations on an OFDM symbol to condition the signal for proper transmission.

SUMMARY

Examples of systems and methods are provided for a data transmitter configured to transmit time domain signals over a network. A prime factor inverse Fourier transform module is configured to receive a frequency domain symbol comprising n samples and to convert the frequency domain symbol into a time domain signal. The prime factor inverse Fourier transform module includes a prime factor module that is configured to perform an inverse Fourier transform on the frequency domain symbol to reduce the number of samples of the frequency domain symbol by a factor of p, where p is a prime number, and where p is a factor of n. The prime factor inverse Fourier transform module further includes a reduced inverse Fourier transform module that is configured to convert the reduced number of samples to a time domain signal for transmission over the network.

As another example, a method of transmitting time domain signals over a network receives a frequency domain symbol comprising n samples. A first inverse Fourier transform is performed on the frequency domain symbol to reduce the number of samples of the frequency domain symbol by a factor of p, where p is a prime number, and where p is a factor of n. A second inverse Fourier transform is performed on all output of the first inverse Fourier transform to convert the reduced number of samples to a time domain signal for transmission over a network, and the time domain signal is transmitted over a network.

DETAILED DESCRIPTION

Figure 1:
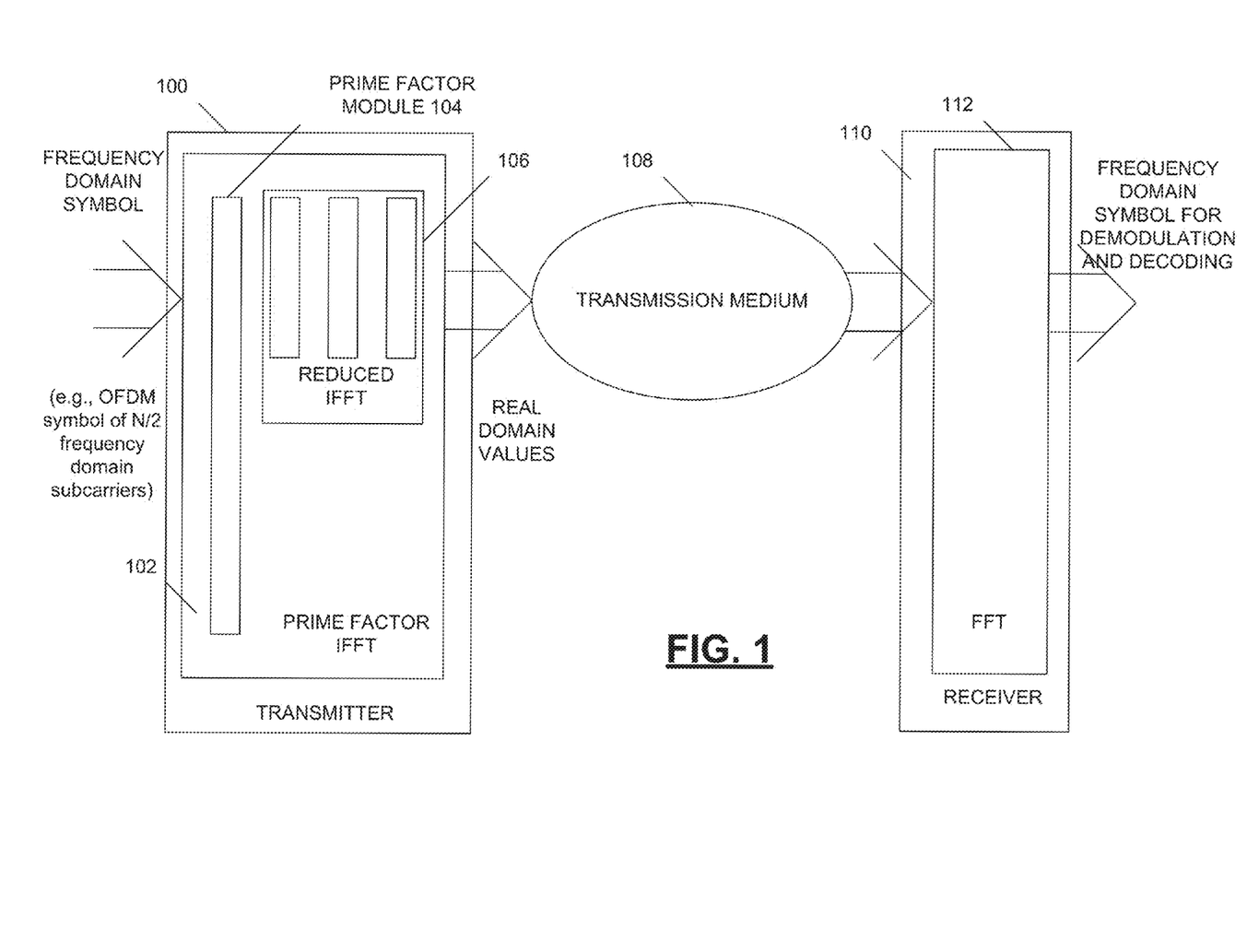
FIG. 1 is a block diagram depicting a data transmitter configured to transmit time domain signals over a network.

FIG. 1 is a block diagram depicting a data transmitter 100 configured to transmit time domain signals over a network. The data transmitter 100 includes a prime factor inverse Fourier transform module 102 that is configured to receive a frequency domain symbol that comprises n samples and to convert the frequency domain symbol into a time domain signal for transmission over a network. The prime factor inverse Fourier transform module 102 includes a prime factor module 104. The prime factor module 104 is configured to perform an inverse Fourier transform on the frequency domain symbol to reduce the number of the samples of the frequency domain symbol by a factor of p, where p is a prime number, and where p is a factor of the number of samples n. The prime factor inverse Fourier transform module 102 further includes a reduced inverse Fourier transform module 106 that is configured to convert the reduced number of samples to a time domain signal for transmission over the network. The inverse Fourier transforms depicted in FIG. 1 may take a variety of forms. In digital communications, fast Fourier transforms and discrete fast Fourier transforms may be used.

The real, time domain values are modulated onto a signal for transmission over a transmission medium 108, such as a wired communication network (e.g., a power line communications network or a wireless corn cation network). The time domain signals are received at a receiver 110 and provided to a fast Fourier transform module 112 for conversion from the time domain to a frequency domain representation. A frequency domain symbol is outputted by the fast Fourier transform module 112 for demodulation and decoding.

Computer-implemented Fourier transform operations often rely on certain hardware and data for proper performance. For example, in an inverse Fourier transform operation, storage, such as Random Access Memory (RAM), is used for storing samples of a received frequency domain signal, storing intermediate computation results, and output data culminating from the inverse Fourier transform operation. Inverse Fourier transform operations may also utilize certain constants for proper computation. For example, a twiddle factor, in a fast Fourier transform algorithm, is a trigonometric constant coefficient that is multiplied by data in the course of the fast Fourier transform algorithm. Storage may also be needed for tracking of twiddle factors. Such storage may come in a variety of forms such as Read Only Memory (ROM), RAM, or hard drive storage.

Figure 2:
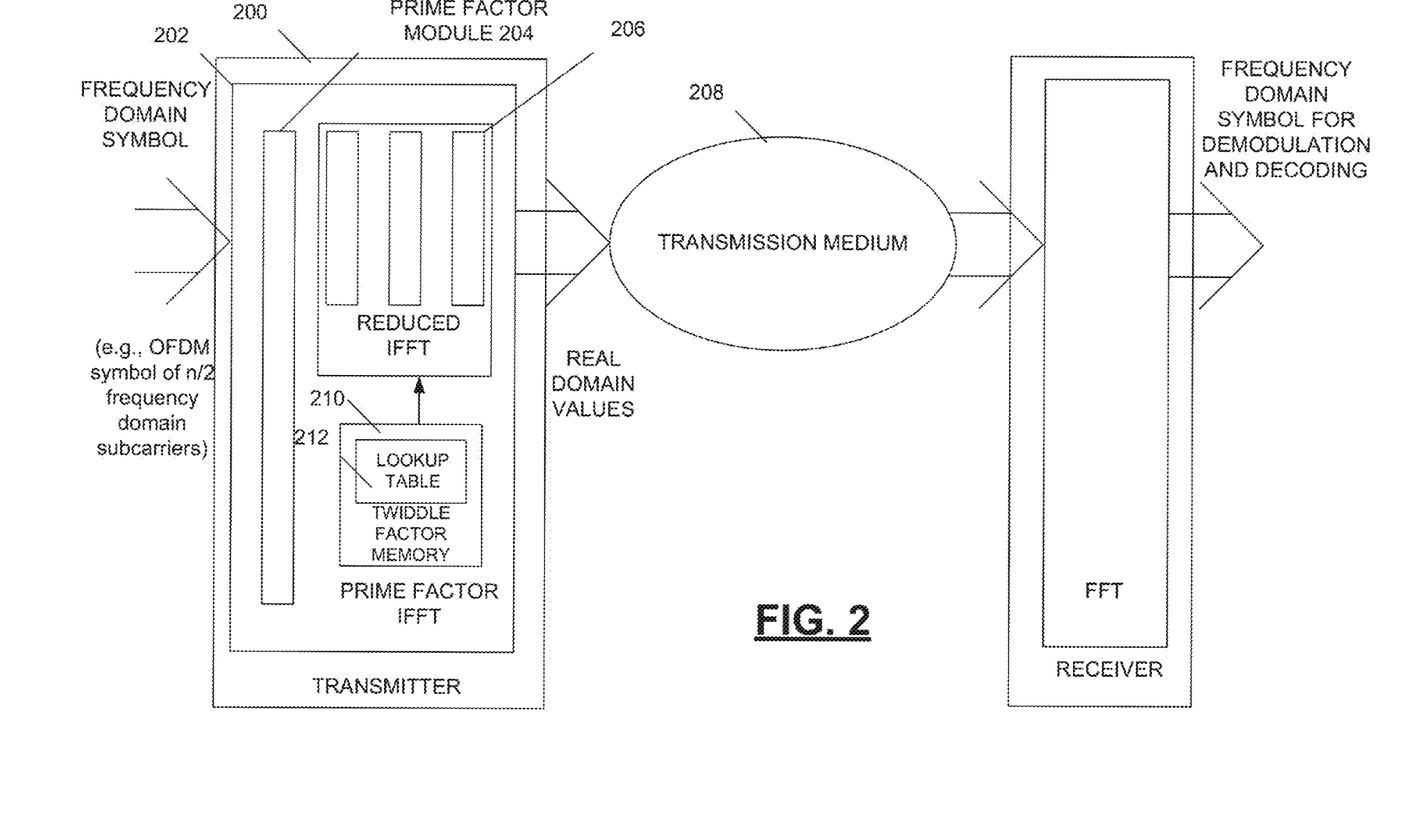
FIG. 2 is a block diagram depicting a data transmitter that includes a prime factor inverse Fourier transform module having a twiddle factor memory.

FIG. 2 is a block diagram depicting a data transmitter that includes a prime factor inverse Fourier transform module having a twiddle factor memory. The data transmitter 200 includes a prime factor inverse Fourier transform module 202 that is configured to receive a frequency domain symbol that comprises n samples and to convert the frequency domain symbol into a time domain signal for transmission over a network. The prime factor inverse Fourier transform module 202 includes a prime factor module 204. The prime factor module 204 is configured to perforin an inverse Fourier transform on the frequency domain symbol to reduce the number of the samples of the frequency domain symbol by a factor of p, where p is a prime number, and where p is a factor of the number of samples n. The prime factor inverse Fourier transform module 202 further includes a reduced inverse Fourier transform module 206 that is configured to convert the reduced number of samples to a time domain signal for transmission over the network 208.

In performing a fast Fourier transform, twiddle factors may sometimes be needed for each of the samples that make up the frequency domain symbol. Such a configuration can result in systems that require undesirable amounts of hardware, such as large ROMs for twiddle factor storage, as well as undesirable levels of computation necessary to proper handle the twiddle factor needs. Reducing such hardware and computational complexity can improve cost and performance of a transmitter 200 system.

Twiddle factor requirements can be reduced in multiple ways. A first reduction can be realized through the use of Hermitian symmetric frequency domain symbols. A Hermitian function is a complex function with a property that the complex conjugate of the complex function is equal to the original function with the variable changed in sign. Such a condition is often the case in frequency division multiplexing schemes. In a Hermitian symmetric environment, only half of the samples of a frequency domain symbols need to be stored and processed, because the complex conjugate of those samples is known on the basis of the Hermitian symmetry. Use of Hermitian symmetric frequency domain symbols enables reduction of twiddle factor requirements by a factor of 2.

Twiddle factor requirements can also be reduced through election of the factor p that is utilized by the prime factor module. As will be described in further detail below, performing an inverse fast Fourier transform operation by a radix p, where p is both a prime number and a factor of the number of samples of the frequency domain symbol, on a Hermitian symmetric frequency domain symbol will result in an output of the prime factor module 204 that is also Hermitian symmetric and reduced in sample size by a factor of p. Further, the prime factor inverse fast Fourier transform operation has no requirement of twiddle factors in performing the operation. Taking advantage of such a relationship by a prime factor module further reduces the twiddle factor requirement by a factor of p. Thus, a combined benefit available based on usage of Hermitian symmetric frequency domain symbols and a prime factor module can reduce twiddle factor requirements by a factor of 2 and a further factor of p.

The prime factor inverse Fourier transform module of FIG. 2 includes a twiddle factor memory 210 that includes a lookup table 212 that holds twiddle factor constants. The twiddle factor memory 210 may take a variety of forms such as a ROM, a RAM, or other volatile or non-volatile storage. The twiddle factor lookup table 212 may be sized according to the needs of the reduced inverse Fourier transform module 206. If the factor p selected for the prime factor module is both a prime number and a factor of the number of samples in the frequency domain symbol (or the number of samples divided by a factor of 2 if Hermitian symmetry compression is utilized), then the prime factor module 204 will not need twiddle factors or access the twiddle factor memory 210. In such a configuration, the lookup table 212 will provide twiddle factors for the reduced inverse Fourier transform module 206. In one example, the lookup table 212 is a ROM that contains constant values for the number of samples in a frequency domain symbol divided by a factor of 2, further divided by a factor of p used by the prime factor module 204, within plus or minus 2 (e.g., for a frequency domain signal having 3072 samples, the Hermitian symmetry enables compression by a factor of 2 to 1536 samples, and a prime factor module that uses a factor of 3 can further reduce the samples, and thus the required number of twiddle factors, to 512).

The prime factor inverse Fourier transform module described above can introduce a structure of a prime-factored $\mathcal{N}$-point Discrete Fourier Transform (DFT) with Hermitian symmetry by dividing the $\mathcal{N}$ points into prime numbers of smaller DFTs. For example, a 24-point DFT can be reduced to 3 smaller 8-point Dirt's, 3 being the prime factor. This is possible because, as will be discussed below, the smaller DFTs retain the Hermitian property, and working with smaller Hermitian DFTs is more efficient because such operations require less hardware resources.

An $\mathcal{N}$-point Discrete Fourier Transform (DFT) is described mathematically as:

$$X(k) = \sum_{n=0}^{\mathcal{N}-1} x(n) \cdot W_{\mathcal{N}}^{nk}, \quad (1)$$

where $$W_{\mathcal{N}}^{nk} = e^{-j2\pi \frac{nk}{N}}.$$

If $\mathcal{N} = \mathcal{N}_1 \mathcal{N}_2$ is a product of two factors which are relatively prime, and using the following index re-mappings, $$n = ((An_1 + Bn_2))_{\mathcal{N}}, \quad \begin{cases} 0 \le n_1 \le \mathcal{N}_1 - 1, \\ 0 \le n_2 \le \mathcal{N}_2 - 1, \end{cases} \quad (2a)$$

$$k = ((Ck_1 + Dk_2))_{\mathcal{N}}, \quad \begin{cases} 0 \le k_1 \le \mathcal{N}_1 - 1, \\ 0 \le k_2 \le \mathcal{N}_2 - 1, \end{cases} \quad (2b)$$

then the DFT can be expressed as a two-dimensional DFT without an intervening twiddle factors:

$$X(Ck_1 + Dk_2) = \sum_{n_2=0}^{\mathcal{N}_2-1} \left[ \sum_{n_1=0}^{\mathcal{N}_1-1} x(An_1 + Bn_2) W_{\mathcal{N}_1}^{k_1 n_1} \right] W_{\mathcal{N}_2}^{k_2 n_2}, \quad (3)$$

One set of solution that satisfies equation (2a) and (2b) is:

$$A = \mathcal{N}_2 \text{ and } B = \mathcal{N}_1, \quad (4a)$$

$$C = \mathcal{N}_2((\mathcal{N}_2^{-1}))_{\mathcal{N}_1} \text{ and } D = \mathcal{N}_1((\mathcal{N}_1^{-1}))_{\mathcal{N}_2}, \quad (4b)$$

where $((\mathcal{N}_2^{-1})_{\mathcal{N}_1}$ denotes the multiplicative inverse of $\mathcal{N}_2$ reduced modulo $\mathcal{N}_1$.

If it can be observed that if the $\mathcal{N}$-point DFT is Hermitian, then the outer dimension of the two-dimensional DFT in (3) is also Hermitian in nature. For a prime-factored DFT with Hermitian symmetry, the two-dimensional DFT consists of a prime number of smaller DFTs in one dimension that retains its Hermitian property.

For example, if $\mathcal{N} = 24 = 3 \times 8$, the two-dimensional DFT can be represented by:

$$X(16k_1 + 9k_2) = \sum_{n_2=0}^{8-1} \left[ \sum_{n_1=0}^{3-1} x(8n_1 + 3n_2)W_3^{k_1 n_1} \right] W_8^{k_2 n_2}, \quad (5)$$

where in this case, $\mathcal{N}_1 = 3$, $\mathcal{N}_2 = 8$, $0 \le n_1 \le 2$, $0 \le n_2 \le 7$, $0 \le k_1 \le 2$, $0 \le k_2 \le 7$, and $A = 8$ and $B = 3$, (6a)

$C = 16$ and $D = 9$, (6b)

For $$k_1 = 0, k_2 = 0, X(0) = \sum_{n_2=0}^{8-1} \left[ \sum_{n_1=0}^{3-1} x(8n_1 + 3n_2)W_3^0 \right] W_8^0,$$

the zero-th entry of X can be tabulated as follows for each $n_2$:

| | $\left[\sum_{n_1=0}^{3-1} x(8n_1 + 3n_2)W_3^0\right] \cdot W_8^0$ |
|---|---|
| $n_2 = 0$ | $[x(0) \cdot W_3^0 + x(8) \cdot W_3^0 + x(16) \cdot W_3^0] \cdot W_8^0$ |
| $n_2 = 1$ | $[x(3) \cdot W_3^0 + x(11) \cdot W_3^0 + x(19) \cdot W_3^0] \cdot W_8^0$ |
| $n_2 = 2$ | $[x(6) \cdot W_3^0 + x(14) \cdot W_3^0 + x(22) \cdot W_3^0] \cdot W_8^0$ |
| $n_2 = 3$ | $[x(9) \cdot W_3^0 + x(17) \cdot W_3^0 + x(1) \cdot W_3^0] \cdot W_8^0$ |
| $n_2 = 4$ | $[x(12) \cdot W_3^0 + x(20) \cdot W_3^0 + x(4) \cdot W_3^0] \cdot W_8^0$ |
| $n_2 = 5$ | $[x(15) \cdot W_3^0 + x(23) \cdot W_3^0 + x(7) \cdot W_3^0] \cdot W_8^0$ |
| $n_2 = 6$ | $[x(18) \cdot W_3^0 + x(2) \cdot W_3^0 + x(10) \cdot W_3^0] \cdot W_8^0$ |
| $n_2 = 7$ | $[x(21) \cdot W_3^0 + x(5) \cdot W_3^0 + x(13) \cdot W_3^0] \cdot W_8^0$ |

It is observed from the table above that the outer $n_2$ loop is Hermitian symmetry, letting a slight modification from X to F:

$F(-x+4) = F^*(x+4)$ (7)

where the function F is now a function of $n_2$, $$F(n_2) = \sum_{n_2=0}^{8-1} \left[ \sum_{n_1=0}^{3-1} x(8n_1 + 3n_2)W_3^0 \right] W_8^0 \quad (8)$$

It can be observed that $F(1) = F^*(7)$, $F(2) = F^*(6)$, ... and so on are complex conjugated to each other since the input pairs $\{x(3), x(21)\}$, $\{x(11), x(13)\}$, $\{x(19), x(5)\}$ are complex conjugated to each other due to the Hermitian Symmetry of the original 24-point DFT. Similarly, for $$k_1 = 1, k_2 = 0, X(16) = \sum_{n_2=0}^{8-1} \left[ \sum_{n_1=0}^{3-1} x(8n_1 + 3n_2)W_3^{n_1} \right] W_8^0$$

can be tabulated as follows:

| | $\left[\sum_{n_1=0}^{3-1} x(8n_1 + 3n_2)W_3^{n_1}\right] \cdot W_8^0$ |
|---|---|
| $n_2 = 0$ | $[x(0) \cdot W_3^0 + x(8) \cdot W_3^1 + x(16) \cdot W_3^3] \cdot W_8^0$ |
| $n_2 = 1$ | $[x(3) \cdot W_3^0 + x(11) \cdot W_3^1 + x(19) \cdot W_3^3] \cdot W_8^0$ |
| $n_2 = 2$ | $[x(6) \cdot W_3^0 + x(14) \cdot W_3^1 + x(22) \cdot W_3^3] \cdot W_8^0$ |
| $n_2 = 3$ | $[x(9) \cdot W_3^0 + x(17) \cdot W_3^1 + x(1) \cdot W_3^3] \cdot W_8^0$ |
| $n_2 = 4$ | $[x(12) \cdot W_3^0 + x(20) \cdot W_3^1 + x(4) \cdot W_3^3] \cdot W_8^0$ |
| $n_2 = 5$ | $[x(15) \cdot W_3^0 + x(23) \cdot W_3^1 + x(7) \cdot W_3^3] \cdot W_8^0$ |
| $n_2 = 6$ | $[x(18) \cdot W_3^0 + x(2) \cdot W_3^1 + x(10) \cdot W_3^3] \cdot W_8^0$ |
| $n_2 = 7$ | $[x(21) \cdot W_3^0 + x(5) \cdot W_3^1 + x(13) \cdot W_3^3] \cdot W_8^0$ |

It is observed from the table above that the outer $n_2$ loop is again Hermitian symmetry:

$F(-x+4) = F^*(x+4)$ (7)

where the function F is now a function of $n_2$, $$F(n_2) = \sum_{n_2=0}^{8-1} \left[ \sum_{n_1=0}^{3-1} x(8n_1 + 3n_2)W_3^{n_1} \right] W_8^0 \quad (8)$$

In general the equation (3) can be re-formulated as follows:

$$\mathcal{F}(n_2) = \sum_{m=n_2}^{n_2} \left[ \sum_{n_1=0}^{\mathcal{N}_1-1} x(An_1 + Bm)W_{\mathcal{N}_1}^{k_1 n_1} \right] W_{\mathcal{N}_2}^{k_2 m}, \quad (9a)$$

and its conjugated symmetry:

$$\mathcal{F}(\mathcal{N} - n_2) = \sum_{m=\mathcal{N}-n_2}^{\mathcal{N}-n_2} \left[ \sum_{n_1=0}^{\mathcal{N}_1-1} x(An_1 + Bm)W_{\mathcal{N}_1}^{k_1 n_1} \right] W_{\mathcal{N}_2}^{k_2 m}, \quad (9b)$$

Figure 3:
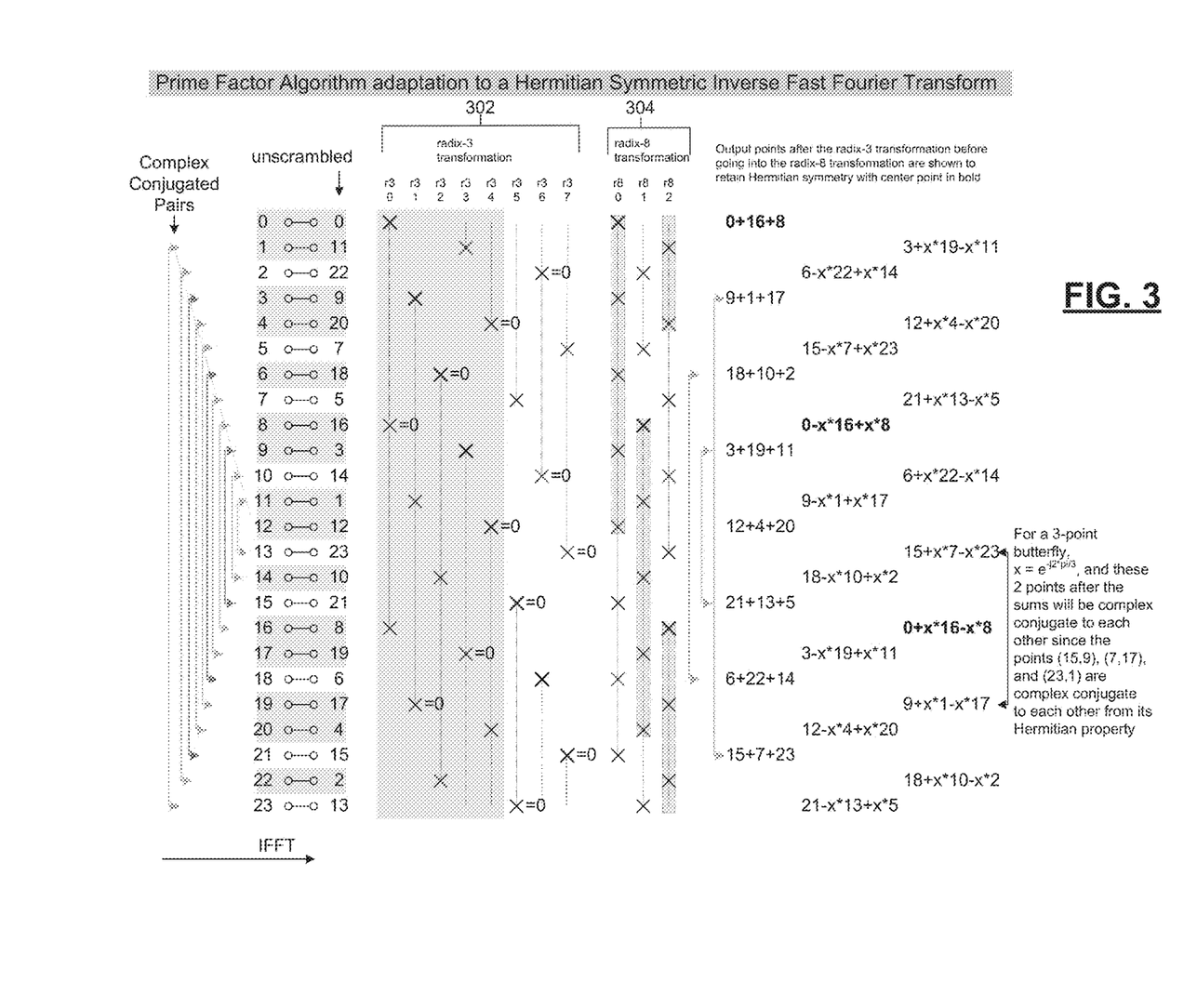
FIG. 3 is a diagram depicting an example where all points for a discrete Fourier transform (DFT) can be computed by observing that the outer summation result is Hermitian in nature.

FIG. 3 is a diagram depicting an example where all points for the DFT can be computed by observing that the outer summation is another smaller Hermitian DFTs in nature. The example of FIG. 3 depicts that all three 8-point DFTs are Hermitian. A complex-conjugated IFFT starts with a prime-factor algorithm at 302 first before doing a complex-conjugated to real IFFT at 304. Such a configuration can limit an amount of twiddle factors and block-floating point exponent RAM utilized based on the scale of the prime factor. FIG. 3 shows a 24-point FFT performed by a prime-factor algorithm using a factor p of 3 in the first stage followed by three 8-point FFT which retains the Hermitian property. The structure is efficient since the smaller 8-point Hermitian can be done in 8/2-point FFT.

The Hermitian property that is inherited by the smaller DFTs can be exploited when calculating the Fast Fourier Transform (FFT). A Hermitian FFT can be computed by dividing the DFT into two separate even and odd functions with twiddle factor. The twiddle factor may be stored in a memory such as a ROM having a size that depends on the size of the DFT points.

Given a Hermitian N-point DFT, $$\mathcal{F}(-x)=\mathcal{F}^*(x) \tag{10}$$

The DFT can be computed by computing a smaller N/2-complex point FFT as follows:

$$Z(k) = \mathcal{E}(k) + W_N^k \mathcal{O}(k), k = 0, 1, \ldots \frac{\mathcal{N}}{2} - 1 \tag{11}$$

where:

$$\mathcal{E}(k) = \frac{\left\{\mathcal{F}(k) + \mathcal{F}^*\left(\frac{\mathcal{N}}{2} - k\right)\right\}}{2}, k = 0, 1, \ldots \frac{\mathcal{N}}{2} - 1 \tag{12a}$$

$$\mathcal{O}(k) = -j\frac{\left\{\mathcal{F}(k) - \mathcal{F}^*\left(\frac{\mathcal{N}}{2} - k\right)\right\}}{2}, k = 0, 1, \ldots \frac{\mathcal{N}}{2} - 1 \tag{12b}$$

The prime-factored N-point Hermitian DFT above can be visualized as consisting of prime numbers of smaller Hermitian DFTs. The smaller $\mathcal{N}/\mathcal{N}_1$-point DFT retains its Hermitian property and requires less hardware.

Twiddle factors of a size $\mathcal{N}$ are required to calculate the $$W_{\mathcal{N}}^k, k = 0, 1, \ldots \frac{\mathcal{N}}{2} - 1.$$

Such a calculation can utilize up to a ROM of size $\mathcal{N}$. However, the above prime-factored $\mathcal{N}$-point Hermitian FFT can be computed using the smaller outer dimension $\mathcal{N}/\mathcal{N}_1$-DFT that can utilize a smaller $\mathcal{N}/\mathcal{N}_1$ ROM.

An $\mathcal{N}$-point complex-conjugated FFT with Hermitian symmetry results in an $\mathcal{N}$-point real-valued FFT and can be computed using an $\mathcal{N}/2$-complex-point FFT; also, if $\mathcal{N}$ is a product of co-prime factors, such an HT is efficient because it does not need twiddle-factor multiplication.

A prime factor inverse Fourier transform module can introduce a structure of a prime-factored $\mathcal{N}$-point Discrete Fourier Transform (DFT) with Hermitian symmetry by dividing the $\mathcal{N}$-points into smaller DFT's instead of working directly with an $\mathcal{N}/2$-complex point FFT. The $\mathcal{N}$-point DFT is first divided by its co-prime into smaller Hermitian DFTs. Such division is efficient because the smaller DFTs retain the Hermitian property, and working with smaller Hermitian DFTs requires less hardware resources.

For example, in one implementation a prime-factored 24-point FFT is utilized. The 24-point FFT is co-primed 3×8 and can thus be computed using a prime factor module on top of three smaller 8-point Hermitian DFTs.

Figure 4:
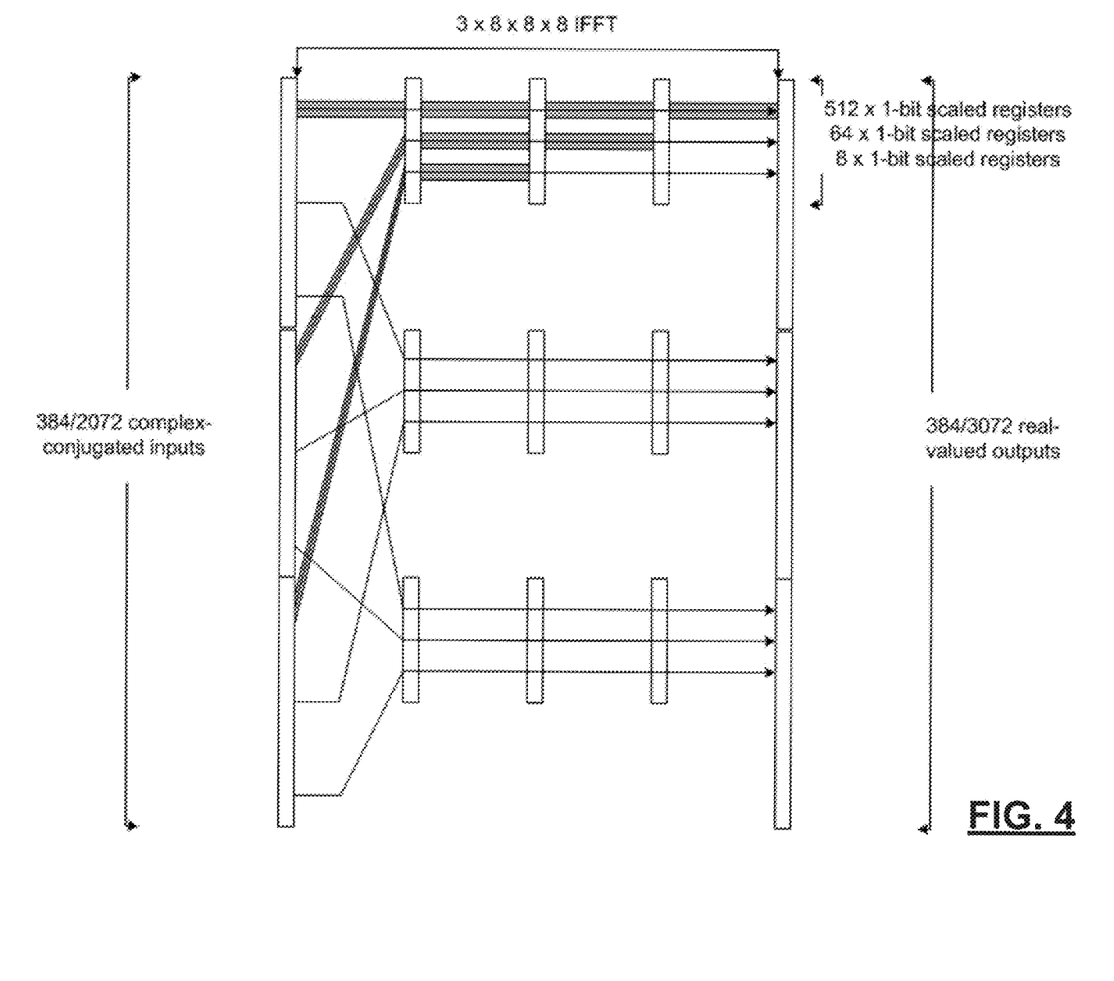
FIG. 4 is a diagram depicting an example of a 3072-point DFT structure.

An example of a 3072-point DFT structure is illustrated in FIG. 4. FIG. 4 shows a structure of dividing a 3072-point DFT into 3×1024; the Hermitian halving of the subsequent 1024-point DFT into 512-complex DFT is more efficient than halving directly on the 3072-point Hermitian DFT. By working on a smaller 1024-point FFT, hardware resources can be reduced.

Figure 5:
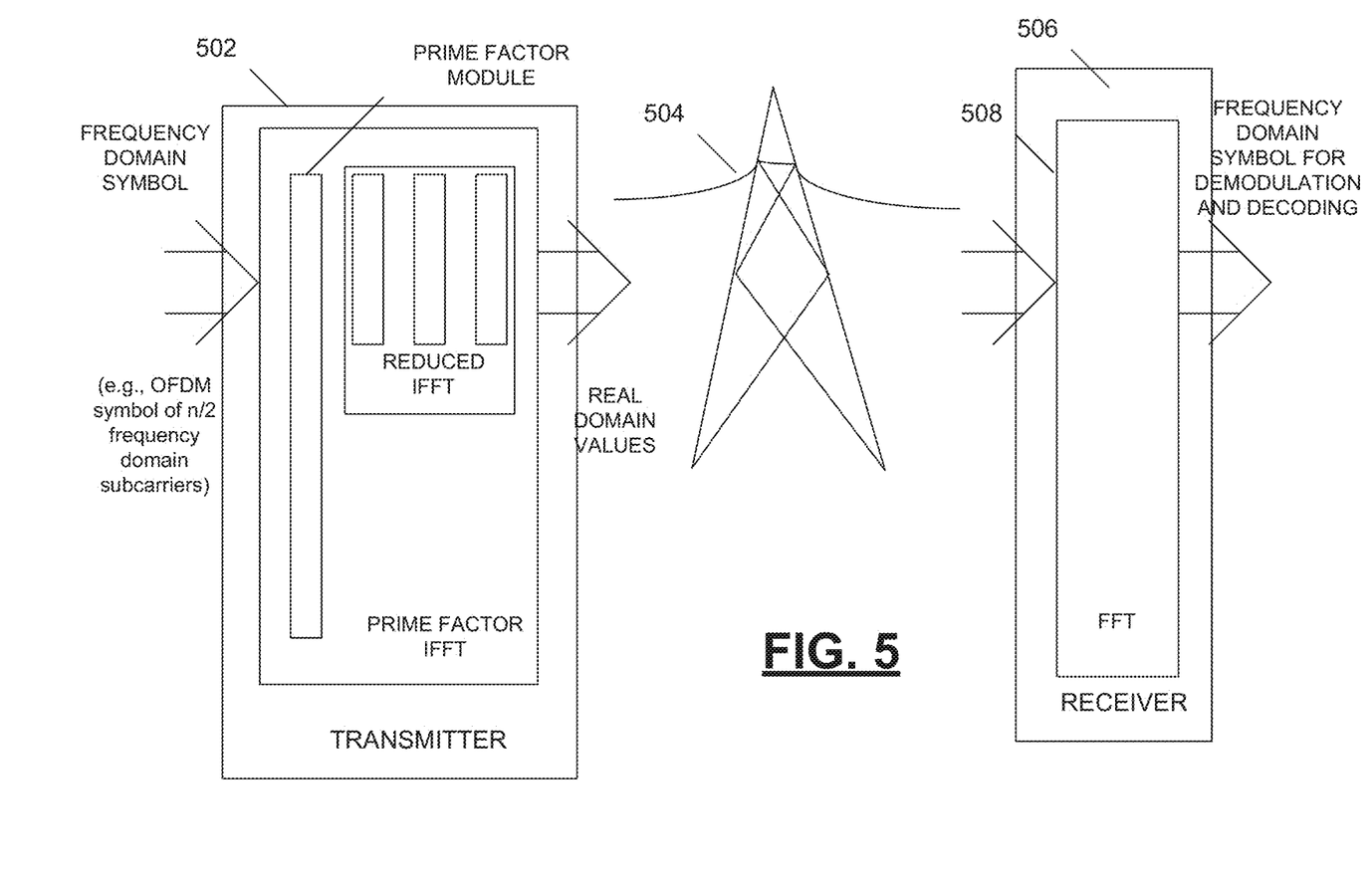
FIG. 5 is a block diagram depicting an example usage scenario for a transmitter using a prime factor inverse Fourier transform module where a signal is transmitted over a power line communications network.

FIG. 5 is a block diagram depicting an example usage scenario for a transmitter using a prime factor inverse Fourier transform module where a signal is transmitted over a power line communications network. In FIG. 5, a frequency domain symbol is converted into a real time domain signal in a transmitter 502. The time domain signal is modulated onto a power line 504, where the signal propagates to a receiver 506. The receiver 506 demodulates and decodes the signal, such as using a fast Fourier transform module 508 to recover the frequency domain symbol.

Figure 6:
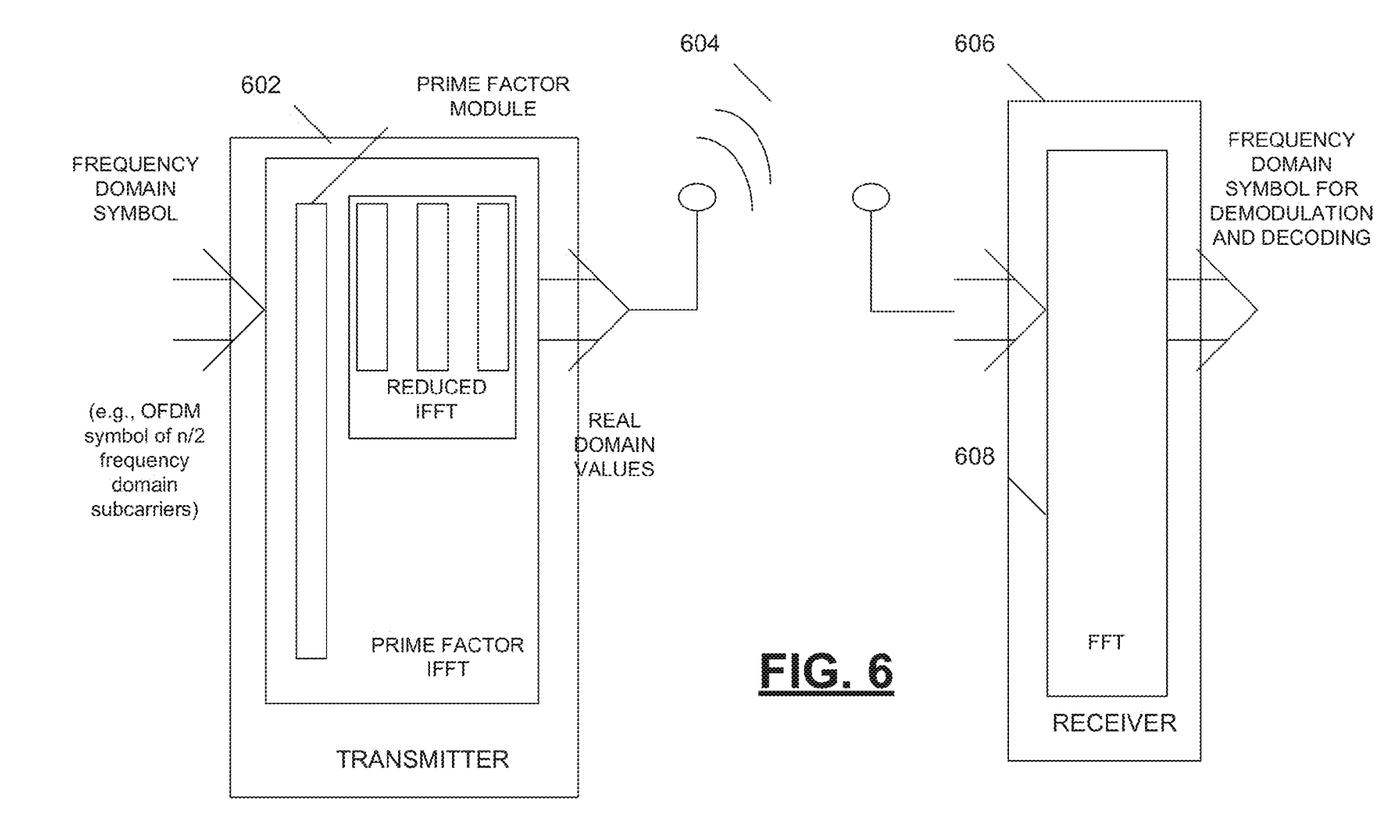
FIG. 6 is a block diagram depicting an example usage scenario for a transmitter using a prime factor inverse Fourier transform module where a signal is transmitted over a wireless network.

FIG. 6 is a block diagram depicting an example usage scenario for a transmitter using a prime factor inverse Fourier transform module where a signal is transmitted over a wireless network. In FIG. 6, a frequency domain symbol is converted into a real time domain signal in a transmitter 602. The time domain signal is modulated through a wireless network 604 via antennas at the transmitter 602 and receiver 606. The receiver 606 demodulates and decodes the signal, such as using a fast Fourier transform module 608 to recover the frequency domain symbol.

Figure 7:
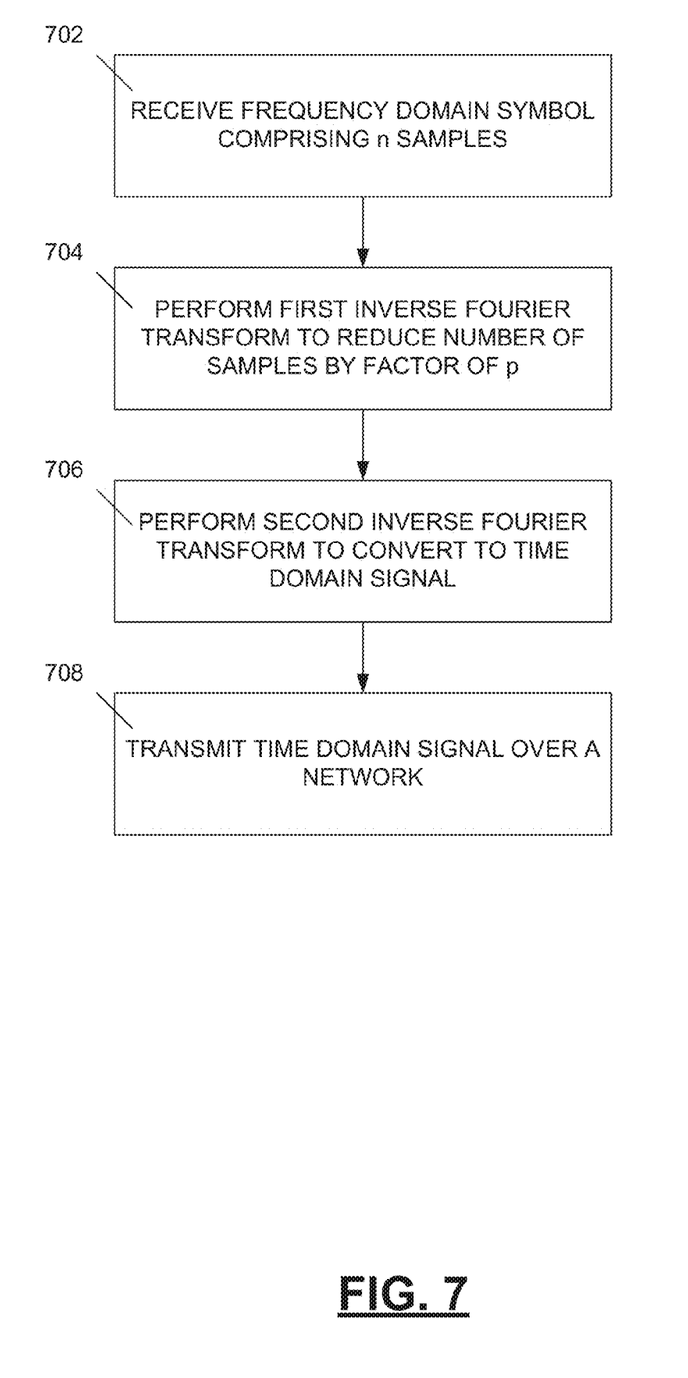
FIG. 7 is a flow diagram depicting a method of transmitting time domain signals over a network.

FIG. 7 is a flow diagram depicting a method of transmitting time domain signals over a network. At 702, a frequency domain symbol comprising n samples is received. At 704, a first inverse Fourier transform is performed on the frequency domain symbol to reduce the number of samples of the frequency domain symbol by a factor of p, where p is a prime number, and where p is a factor of r. At 706, a second inverse Fourier transform is performed on an output of the first inverse Fourier transform to convert the reduced number of samples to a time domain signal for transmission over a network. At 708, the time domain signal is transmitted over the network.

While this disclosure uses specific examples to illustrate various implementations, the patentable scope of the claims may include other examples.

What is claimed is:

1. A transmitter configured to transmit time domain signals over a network, the transmitter comprising:
    a prime factor inverse Fourier transform module configured to i) receive a frequency domain symbol comprising n samples, and ii) to convert the frequency domain symbol into a time domain signal, wherein the prime factor inverse Fourier transform module comprises:
        a prime factor module configured to perform an inverse Fourier transform on the frequency domain symbol to reduce the number of samples of the frequency domain symbol by a factor of p, wherein p is a prime number, and wherein p is a factor of n, and
        a reduced inverse Fourier transform module configured to convert the reduced number of samples to a time domain signal for transmission over the network.

2. The transmitter of claim 1, wherein the prime factor module does not use a twiddle factor memory in reducing the number of samples of the frequency domain symbol.

3. The transmitter of claim 1, wherein the reduced discrete inverse fast Fourier transform module includes a twiddle factor memory, wherein an amount of the twiddle factor memory m that is used by the reduced inverse Fourier transform module is based on i) the number of samples n and ii) the factor p.

4. The transmitter of claim 3, wherein the twiddle factor memory is encoded with a twiddle factor lookup table, wherein the twiddle factor lookup table is utilized in performing the conversion by the reduced inverse Fourier transform module.

5. The transmitter of claim 4, wherein the amount of memory that is used is about equal to n divided by p divided by 2.

6. The transmitter of claim 4, wherein the memory is a read only memory.

7. The transmitter of claim 1, wherein p is a prime number greater than 2.

8. The transmitter of claim 1, wherein the time domain signal is modulated onto a power line for transmission.

9. The transmitter of claim 1, wherein the time domain signal is transmitted in a wireless network using an antenna.

10. The transmitter of claim 1, wherein the frequency domain symbol has n=3072 samples, the prime factor module uses a factor p=3, and the memory is encoded with m=512 entries.

11. The transmitter of claim 1, wherein the frequency domain symbol is a symbol having Hermitian symmetry, wherein the output of the prime factor module is also Hermitian symmetric.

12. The transmitter of claim 11, wherein the frequency domain symbol is compressed by a factor of two based on the frequency domain symbol having Hermitian symmetry, and wherein the frequency domain symbol is compressed by a factor of p by the prime factor module.

13. A method of transmitting time domain signals over a network, the method comprising:
   receiving a frequency domain symbol comprising n samples;
   performing a first inverse Fourier transform on the frequency domain symbol to reduce the number of samples of the frequency domain symbol by a factor of p, wherein p is a prime number, and wherein p is a factor of n;
   performing a second inverse Fourier transform on an output of the first inverse Fourier transform to convert the reduced number of samples to a time domain signal for transmission over a network; and
   transmitting the time domain signal over the network.

14. The method of claim 13, wherein performing the first inverse Fourier transform does not utilize twiddle factor constants in reducing the number of samples of the frequency domain symbol.

15. The method of claim 13, wherein performing the second inverse Fourier transform uses a twiddle factor lookup table encoded on a computer-readable medium, wherein the twiddle factor lookup table is sized based on the number of samples n and the factor p.

16. The method of claim 15, wherein the twiddle factor lookup table contains about n divided by p divided by 2 entries.

17. The method of claim 13, wherein the frequency domain symbol is a signal having Hermitian symmetry, wherein the reduced number of samples outputted when performing the first inverse Fourier transform is also Hermitian symmetric.

18. The method of claim 17, wherein the frequency domain symbol is comprised by a factor of two based on the frequency domain symbol having Hermitian symmetry, and wherein the frequency domain symbol is further compressed by a factor of p when performing the first inverse Fourier transform.

19. The method of claim 13, wherein the time domain signal is transmitted over a power line communication network or a wireless network.

20. The method of claim 13, wherein p is a prime number greater than 2.

* * * * *